Jan. 17, 1956 L. W. T. CUMMINGS 2,731,399
REACTION VESSEL FOR COKE REMOVAL
Filed Jan. 21, 1952
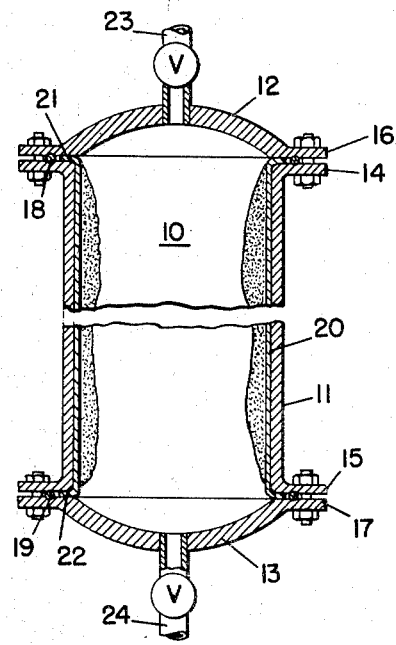
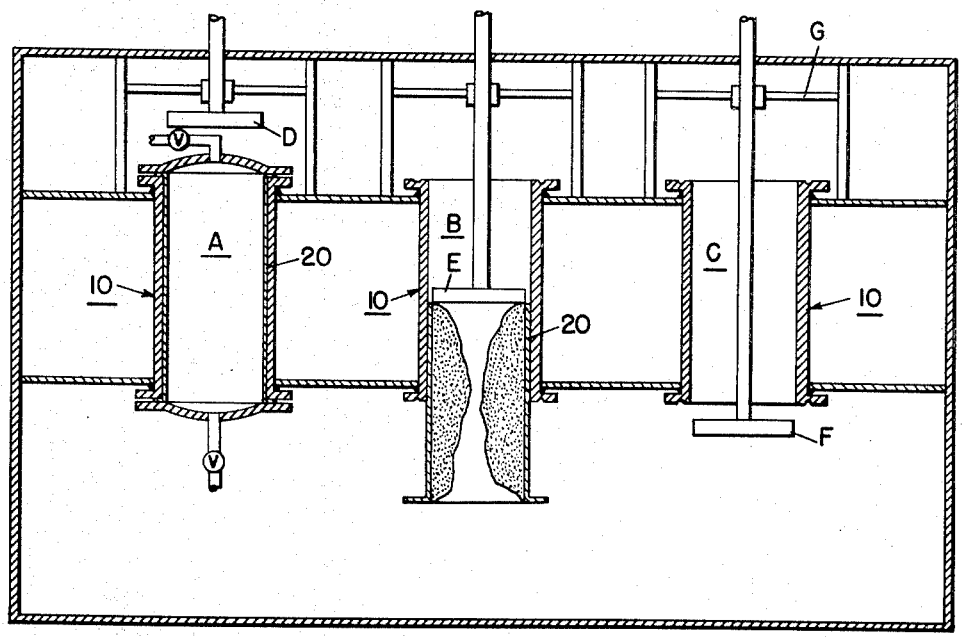
INVENTOR.
LELAND W. T. CUMMINGS
ATTORNEYS United States Patent Office 2,731,399
Patented Jan. 17, 1956

2,731,399

REACTION VESSEL FOR COKE REMOVAL

Leland W. T. Cummings, Wyncote, Pa., assignor to Sun Oil Company, Philadelphia, Pa., a corporation of New Jersey Application January 21, 1952, Serial No. 267,476

2 Claims. (Cl. 196—122)

This invention relates to hydrocarbon coking operations and particularly is directed to the efficient and ready removal of coke formed in a reaction vessel undergoing any of the usual hydrocarbon reactions in which a coke deposit is formed within the vessel.

Coke formed during a commercial hydrocarbon reaction solidifies rapidly and adheres to the inner wall of the reaction vessel presenting a difficult and time consuming problem for its removal before the vessel can again be used to effect a reaction. Various expedients have been resorted to with varying degrees of success but to my knowledge none has overcome the problem with such facility as the instant invention. It is known to provide removable elements, such as, chains or rods within the reaction vessel to which some of the coke adheres as it is formed and which is removed from the vessel along with the removable elements. The coke remaining in the vessel can then be more readily removed since it will exist more in the nature of a broken mass rather than a solidified mass. It also has been proposed to provide a plurality of agitators within the vessel which are maintained in motion in order to prevent solidification of the deposit during a reaction to permit its ready removal.

The present invention is directed to a different concept of coke removal and is predicated on the idea of preventing the coke from adhering to the vessel wall during a reaction and removing it from the vessel as a solidified unit after the hydrocarbon reaction has taken place.

In practicing the invention the inner wall of the vessel is lined or provided with a covering which will prevent the coke from adhering to the inner wall of the vessel while the coke forms into a solidified mass which may then be ejected from the vessel. To this end cylindrical liners formed of the same material as the vessel may be used or heat resistant liners of aluminum or glass may also be used. A coating of silicone resin, for example, may be applied to the vessel wall to prevent adherence of the coke to the vessel wall until the coke builds up and forms its own outer shell within which more coke may deposit and form a solidified mass which may be readily removed by ejection from the vessel.

Referring to the drawings for a more detailed explanation of the invention wherein:

Figure 1 is a view in sectional elevation showing my invention as applied to a reaction vessel.

Figure 2 is a view in sectional elevation of the invention showing a multiplicity of the vessels in several stages of cyclical operation.

In Figure 1, the reaction vessel is generally indicated at 10 and is formed of a side wall 11 usually cylindrical in shape with upper and lower end enclosures 12 and 13 respectively. In order to secure the vessel together in pressure tight condition in preparation to undergo a hydrocarbon reaction, outwardly extending flanges 14 and 15 are provided at the upper and lower ends respectively of the side wall 11 and cooperating outwardly extending flanges 16 and 17 are provided respectively on the upper and lower closure members 12 and 13 which are removably secured to the side wall by suitable bolts. In order to make the vessel pressure tight, sealing rings 18 and 19 may be provided between the upper and lower cooperating flanges of the side wall 11 and closure members 12 and 13.

The removable liner 20 of metal or glass fabrics in cylindrical form is inserted in the vessel to be positioned in close fitting engagement with the inner surface of wall 11. The liner 20 may be serrated at its upper and lower edges to form fingers 21 and 22 to provide for its securement between the flanges of the closure members and the side wall 11. Valved conduits 23 and 24 communicate with the reaction vessel 10 and preferably communicate through the closure members 12 and 13 respectively for the supply of reactants to the vessel and for the removal of reaction products therefrom. When the reaction is completed, the closure members 12 and 13 are removed and the liner 20 ejected with the solidified coke confined therewithin. If only a coating or covering of heat resistant material such as silicone resin has been applied to the inner wall of the vessel to prevent adherence of the coke to the wall, the coke alone may be readily removed as a solidified mass.

Figure 2 shows a system involving a multiplicity of reaction vessels which are arranged for cyclic operation wherein one vessel is undergoing a hydrocarbon reaction while the remaining two vessels are undergoing the decoking operation. Consider vessel A to be undergoing a reaction, vessel B to be half way through the decoking operation, and vessel C as having been completely decoked and prepared to undergo its subsequent hydrocarbon reaction. Vessel C will then begin its hydrocarbon reaction. After a time period sufficient for its coke removal, vessel B will begin to undergo its hydrocarbon reaction while the vessel A will have completed its hydrocarbon reaction and be ready for its decoking operation and the cycle repeated. Ejectors D, E, and F are provided respectively for decoking the vessels A, B and C and suitable apparatus for driving the common ejector shaft G to reciprocate the ejectors may be provided. The mechanical details for operating the ejectors are not completely shown since this is considered a matter of mechanical skill and any desired means may be utilized. After the deposited coke is ejected from the vessels in a solidified mass it may then, if desired, be passed through a quenching zone to reduce it to small fragments or crushed to a powdery state for market.

Prior to ejecting the deposited coke from the vessels it may be necessary to purge the coke with steam or other inert fluid in order to remove therefrom volatile hydrocarbons or to otherwise treat the coke to remove undesirable constituents. It may also me found advantageous or necessary to provide for the continuous passage of steam or other inert fluid between the side wall 11 of the vessel and the liner 20 in order to prevent any leakage of the hydrocarbon reactants or hydrocarbon products therebetween which might adversely affect the removal of the coke.

I claim:

1. Means for removing deposits of carbon from a hydrocarbon reaction vessel comprising the combination, with an open-ended cylindrical reaction vessel of uniform cross-sectional area with removable end heads having inlets and outlets opening directly into the cylindrical reaction vessel, of an open-ended liner to which deposited carbon is adherent and shaped to conform to, and of greater length than, the wall of the reaction vessel and having its free ends extending outward under, and confined by, the end heads when applied to the reaction vessel, and an ejector conforming approximately in shape and area to the cross-sectional shape and area of the liner and, upon removal of one end head, insertable in that end of, and slidable throughout the length of, the reaction vessel and, upon removal of the other end head, so operable axially of the then open-ended reaction vessel as to slide the liner and carbonaceous deposits thereon as a unit and simultaneously eject them as a unit from the other end of the reaction vessel.

2. Means for removing deposits of carbon from a hydrocarbon reaction vessel comprising the combination, with an open-ended cylindrical reaction vessel of uniform cross-sectional area with removable end heads having inlets and outlets opening directly into the cylindrical reaction vessel, of an open-ended liner to which deposited carbon is adherent and shaped to conform to, and of greater length than, the wall of the reaction vessel and having its free ends extending outward under, and confined by, the end heads when applied to the reaction vessel, and an ejector conforming approximately in shape and area to the cross-sectional shape and area of the liner and, upon removal of one end head, insertable in that end of, and slidable throughout the length of, the reaction vessel and, upon removal of the other end head, so operable axially of the reaction vessel as to effect the removal of the carbonaceous material and eject it from said other end of the reaction vessel.

References Cited in the file of this patent

UNITED STATES PATENTS

| | | |
|---|---|---|
| 1,935,067 | Vobach et al. | Nov. 14, 1933 |
| 2,144,109 | Gilkerson | Jan. 17, 1939 |
| 2,354,163 | Weizmann et al. | July 18, 1944 |